United States Patent
Schirmer et al.

(10) Patent No.: US 9,626,657 B2
(45) Date of Patent: Apr. 18, 2017

(54) CLUSTERING ELECTRONIC CALENDAR SCHEDULES TO REDUCE VISUAL COMPLEXITY AND IMPROVE EFFICIENCY OF MEETING SCHEDULING

(75) Inventors: Andrew L. Schirmer, Andover, MA (US); Tolga Oral, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 1708 days.

(21) Appl. No.: 11/966,124

(22) Filed: Dec. 28, 2007

(65) Prior Publication Data

US 2009/0172592 A1 Jul. 2, 2009

(51) Int. Cl.
*G06Q 10/10* (2012.01)
*G06Q 10/06* (2012.01)

(52) U.S. Cl.
CPC ....... *G06Q 10/109* (2013.01); *G06Q 10/1093* (2013.01); *G06Q 10/06* (2013.01)

(58) Field of Classification Search
CPC ............... G06F 3/0482; G06F 3/0236; G06F 17/30477; G06F 17/30554; G06F 15/0266; G06Q 10/06; G06Q 10/10; G06Q 10/109; G06Q 10/1093
USPC ................................. 715/810, 764
See application file for complete search history.

(56) References Cited

U.S. PATENT DOCUMENTS 6,480,885 B1 * 11/2002 Olivier .......................... 709/207
7,409,429 B2 * 8/2008 Kaufman et al. ............. 709/207
2001/0014867 A1 8/2001 Conmy
2003/0233265 A1 12/2003 Lee et al.
2004/0128304 A1 7/2004 Rokosz
2005/0262164 A1 11/2005 Guiheneuf et al.
2005/0273372 A1 12/2005 Bowne et al.
2006/0045029 A1 3/2006 Ethier et al.
2006/0167731 A1 7/2006 Nishimura et al.
2006/0200374 A1 9/2006 Nelken
2007/0005406 A1 1/2007 Asadian et al.

(Continued)

OTHER PUBLICATIONS

Lee, et al., An Intelligent Fuzzy Meeting Agent for Decision Support System, The IEEE International Conference on Fuzzy Systems, 2003, pp. 1086-1091.

(Continued)

*Primary Examiner* — Jeffrey A Gaffin
*Assistant Examiner* — Rinna Yi
(74) *Attorney, Agent, or Firm* — BainwoodHuang (57) ABSTRACT

A system for clustering electronic calendar schedules in an event scheduling user interface displays the availability of invitee clusters that each include invitees with sufficiently similar availability during a target period. An invitee cluster list includes an invitee cluster entry for each invitee cluster, such that each invitee cluster entry displays the availability for all invitees contained in the corresponding cluster, as well as the number of invitees contained in the cluster. Invitees that do not belong to any cluster are listed as individual outlier entries, such that each outlier entry displays the availability for the corresponding outlier invitee and the invitee's name. The names of invitees contained in an invitee cluster are displayed in response to user selection of the cluster entry. A degree of similarity required for invitees to be clustered together, and/or a permitted total number of clusters, may be input from a user.

19 Claims, 8 Drawing Sheets

(56) References Cited

U.S. PATENT DOCUMENTS

2007/0005408 A1    1/2007   Boss et al.
2007/0005409 A1    1/2007   Boss et al.
2007/0021997 A1    1/2007   Hayes, Jr. et al.

OTHER PUBLICATIONS

Lee, et al., A Genetic Fuzzy Decision Agent based on Personal Ontology for Meeting Scheduling Support System, IEEE, 2004, pp. 105-109.

* cited by examiner

| INVITEE | 9:00AM | 10:00AM | 11:00AM | 12:00PM | 1:00PM | 2:00PM | 3:00PM | 4:00PM | 5:00PM |
|---|---|---|---|---|---|---|---|---|---|
| Tolga | BUSY | | | BUSY | BUSY | | | BUSY | |
| Sandra | BUSY | BUSY | | BUSY | BUSY | BUSY | | | |
| Andy | BUSY | | | BUSY | BUSY | | | BUSY | |
| Thomas | BUSY | BUSY | | BUSY | BUSY | BUSY | | | |
| Helen | BUSY | BUSY | BUSY | BUSY | BUSY | BUSY | BUSY | BUSY | |
| Andreas | BUSY | | | BUSY | BUSY | | | BUSY | BUSY |
| Druva | BUSY | | | BUSY | BUSY | | | BUSY | |
| Mehmet | BUSY | BUSY | | BUSY | BUSY | BUSY | | | |

| INVITEE CLUSTER | 9:00AM | 10:00AM | 11:00AM | 12:00PM | 1:00PM | 2:00PM | 3:00PM | 4:00PM | 5:00PM |
|---|---|---|---|---|---|---|---|---|---|
| Invitee Cluster 1 (4) | BUSY | BUSY | | BUSY | BUSY | | BUSY | | |
| Invitee Cluster 2 (3) | BUSY | BUSY | | BUSY | BUSY | BUSY | | | |
| Helen | BUSY | BUSY | BUSY | BUSY | BUSY | BUSY | BUSY | BUSY | BUSY |

*FIG. 6*

| INVITEE | 9:00AM | 10:00AM | 11:00AM | 12:00PM | 1:00PM | 2:00PM | 3:00PM | 4:00PM | 5:00PM | 6:00PM |
|---|---|---|---|---|---|---|---|---|---|---|
| Tolga | BUSY | | | BUSY | BUSY | | | BUSY | BUSY | |
| Sandra | BUSY | BUSY | | BUSY | BUSY | BUSY | | | | |
| Andy | BUSY | | | BUSY | BUSY | | | BUSY | BUSY | BUSY |
| Thomas | BUSY | BUSY | | BUSY | BUSY | BUSY | | | | |
| Helen | BUSY | BUSY | BUSY | BUSY | BUSY | BUSY | BUSY | BUSY | BUSY | |
| Andreas | BUSY | | | BUSY | BUSY | | | BUSY | BUSY | |
| Druva | BUSY | BUSY | | BUSY | BUSY | BUSY | | BUSY | | |
| Mehmet | BUSY | BUSY | | BUSY | BUSY | BUSY | | | | |

*FIG. 7*

| INVITEE CLUSTER | 9:00AM | 10:00AM | 11:00AM | 12:00PM | 1:00PM | 2:00PM | 3:00PM | 4:00PM | 5:00PM | 6:00PM |
|---|---|---|---|---|---|---|---|---|---|---|
| Invitee Cluster 1 (4) | BUSY | BUSY | | | BUSY | BUSY | | BUSY | | |
| Invitee Cluster 2 (3) | BUSY | | | BUSY | BUSY | | | BUSY | BUSY | BUSY |
| Helen | BUSY | BUSY | BUSY | BUSY | BUSY | BUSY | BUSY | BUSY | BUSY | |

FIG. 8

CLUSTERING ELECTRONIC CALENDAR SCHEDULES TO REDUCE VISUAL COMPLEXITY AND IMPROVE EFFICIENCY OF MEETING SCHEDULING

FIELD OF THE INVENTION

The disclosed system relates generally to electronic calendaring, and more specifically to a method and system for clustering electronic calendar schedules to reduce visual complexity and improve efficiency of meeting scheduling.

BACKGROUND OF THE INVENTION

As it is generally known, electronic calendaring tools are widely used in corporate environments to schedule meetings with colleagues. Existing systems are capable of automatically checking the electronic calendars of team members for open time slots, proposing alternative meeting times, scheduling meetings, and notifying/reminding participants of meetings by electronic mail ("e-mail"). A shortcoming of existing systems arises from the fact that the number of meeting invitees can be quite large, making the use of scheduling features difficult.

Figure 1:
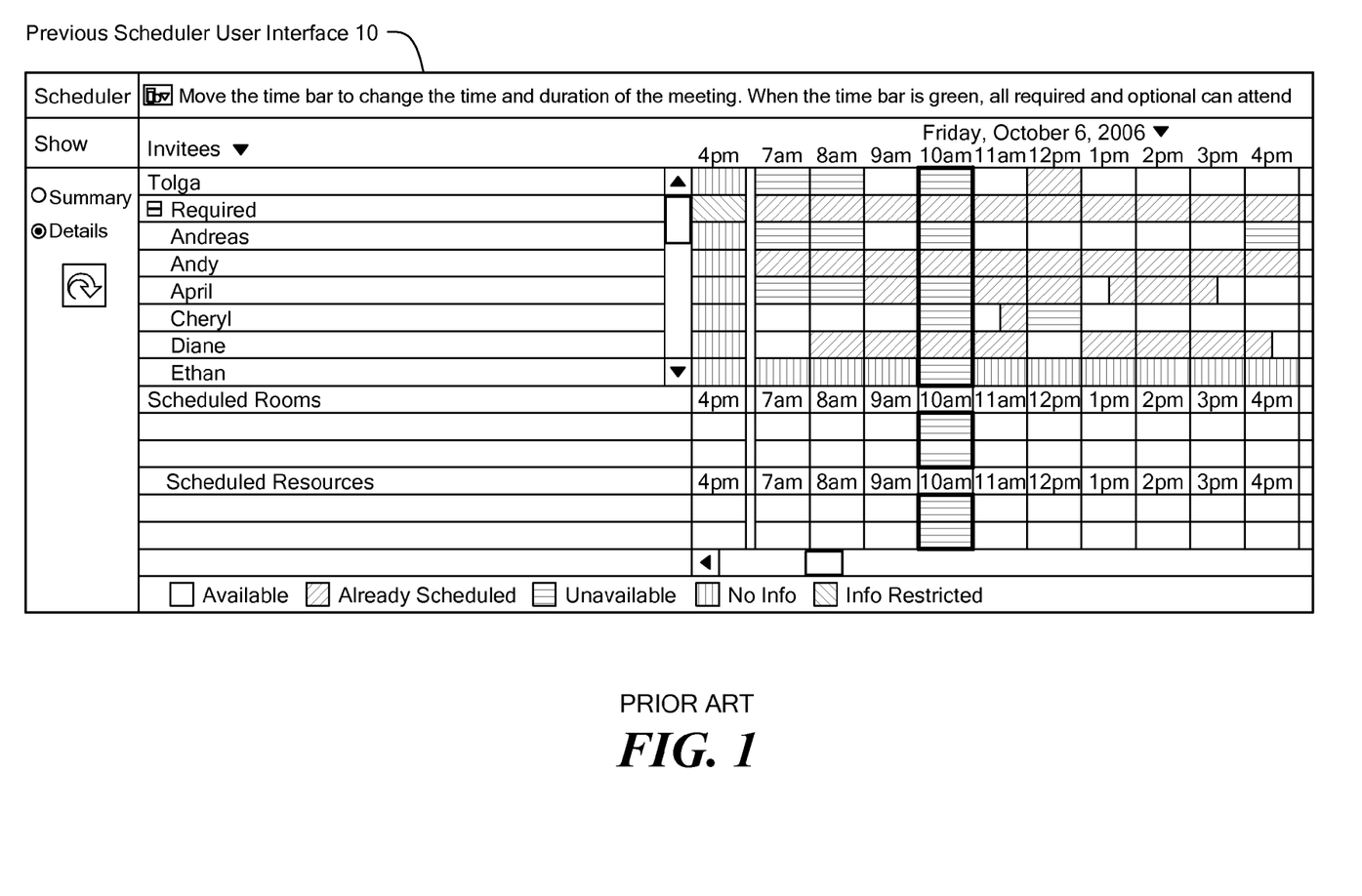
FIG. 1 is a simplified screen shot showing a user interface display provided by a previous system.

FIG. 1 shows an example of an event scheduling user interface in an existing electronic calendaring system. The user interface example of FIG. 1 displays information for a meeting with fifteen (15) meeting invitees. As seen in FIG. 1, when there are more invitees than can be simultaneously displayed within a single screen (the set of invitees in FIG. 1 extends beyond the currently visible names), it may be impossible to easily view all the invitee names at once, and the user must scroll up and down when trying to see which invitees can and cannot attend at a chosen time. Even if the event scheduling user interface allows more (or all) invitees' calendars to be shown, it is still very difficult for the user to see patterns regarding common free times, and/or which calendars are busiest. In particular, the event scheduling user interface in such existing systems makes it difficult to quickly identify who cannot attend and who will be hardest to schedule.

For the above reasons and others, it would be desirable to have a new system for providing an event scheduling user interface in an electronic calendar that clusters invitee calendars in various ways to simplify the view, in order to allow the scheduling user to see quickly whether there are scheduling difficulties. In addition, it would be desirable for such a system to operate such that if scheduling difficulties are identified, the user can easily focus on particular problems and deal with them more efficiently, without being distracted by unnecessary details.

SUMMARY OF THE INVENTION

To address the above described and other shortcomings of previous techniques, a new method and system are disclosed for clustering electronic calendar schedules in order to reduce visual complexity and improve efficiency of meeting scheduling. The disclosed system generates an event scheduling user interface that allows a scheduling user to view clustered invitee calendars, providing a simplified view of schedules to reduce complexity and improve the efficiency and accuracy of a scheduling operation.

The disclosed system provides clustering with regard to the availability of invitees to a meeting. The invitee clustering of the disclosed system displays the availability of invitee clusters, where each invitee cluster includes invitees with sufficiently similar availability during a target period (e.g. a given day or days). The disclosed system can be embodied to provide attendee clustering based on similarity of any specific kinds of availability status associated with time intervals in user schedules, including, but not limited to, "BUSY" and "AVAILABLE" statuses.

In a first aspect of the disclosed system, invitees are clustered together that have identical availability during the target period. The disclosed system generates a user interface display object with an invitee cluster list that includes an invitee cluster entry for each invitee cluster, such that each invitee cluster entry displays the availability for all invitees contained in the corresponding cluster, as well as the number of invitees contained in the cluster. Invitees that do not belong to any cluster are listed as individual outlier entries, such that each outlier entry displays the availability for the corresponding outlier invitee and the invitee's name. The disclosed system further provides access to the names of invitees contained in each cluster, e.g. in response to selection of the cluster entry, which causes the disclosed system to present an invitee list of invitee entries for each invitee contained in the selected cluster.

In another aspect of the disclosed system, invitees are clustered together that have sufficiently similar availabilities during the target time period. The degree of similarity required for invitees to be clustered together may be input from a system administrator user, and/or by the scheduling user, in order to produce more or fewer invitee clusters, as desired. In one embodiment, the degree of similarity for invitees to be clustered together is specified/input through a user interface object generated by the disclosed system as a percentage of available time. Alternatively, or in addition, the disclosed system may be embodied to generate a user interface object through which a maximum total number of invitee clusters is input by a system administrator and/or the scheduling user, such that the disclosed system clusters the invitees into no more than the specified maximum number of invitee clusters.

By clustering invitees into groups based on common availability in the target time period, the disclosed system enables a scheduling user to conveniently identify which times are convenient to the most invitees, and to easily determine whether any key invitees are within a given invitee cluster, or are within the set of outliers in the invitee set.

Thus there is disclosed a new system for providing an event scheduling user interface in an electronic calendar that clusters invitee calendars in various ways to simplify the view, in order to allow the scheduling user to see quickly whether there are scheduling difficulties. The disclosed system additionally operates such that if scheduling difficulties are identified, the user can easily focus on particular problems and deal with them more efficiently, without being distracted by unnecessary details.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 2:
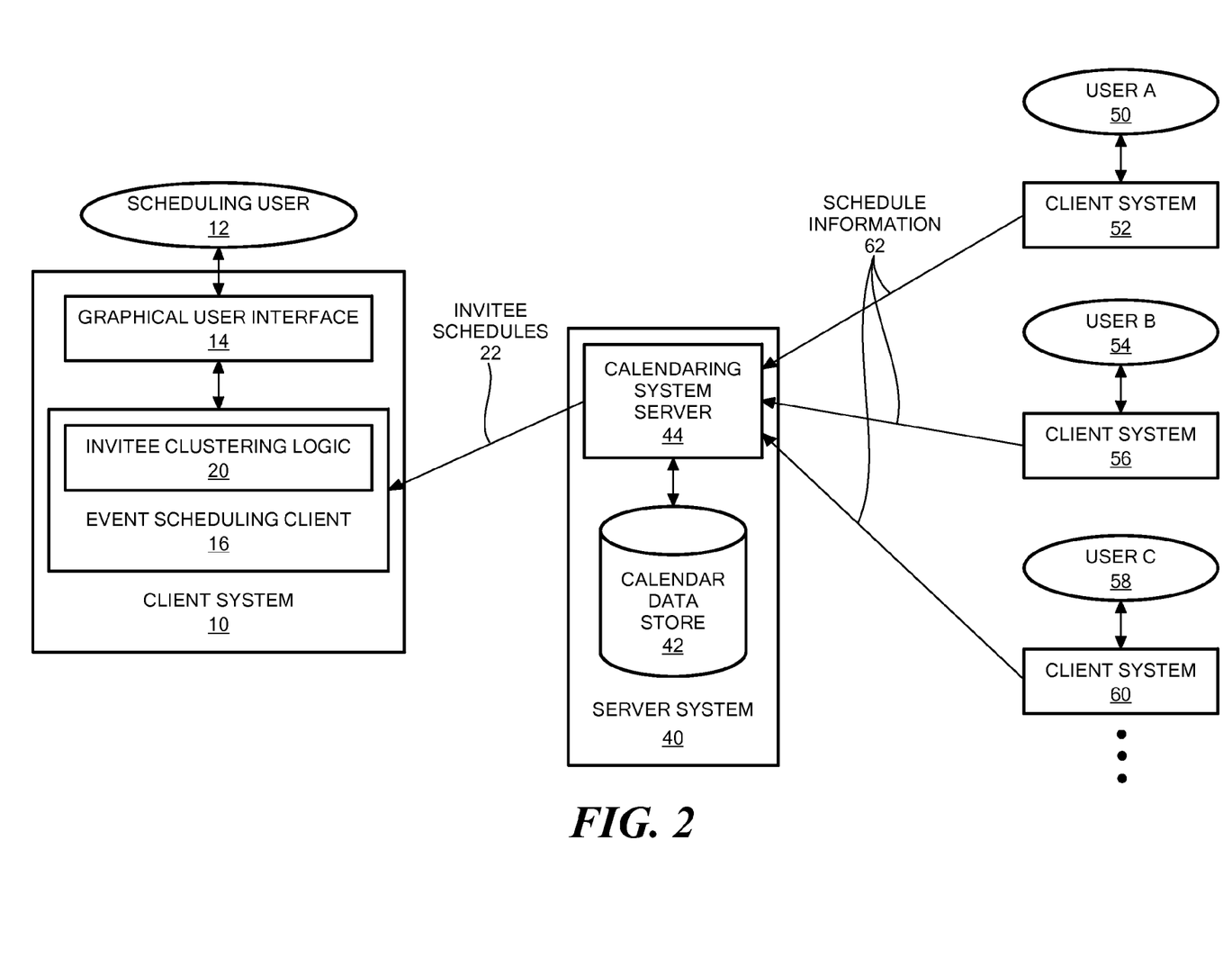
FIG. 2 is a block diagram showing hardware and software components in an illustrative embodiment.

FIG. 2 is a block diagram showing hardware and software components in an illustrative embodiment. As shown in FIG. 2, a Scheduling User 12 uses a Graphical User Interface 14 generated by an Event Scheduling Client 16 executing on a Client System 10. The Event Scheduling Client 16 may, for example, be a client portion of an electronic calendaring application or the like. The Event Scheduling Client 16 includes Invitee Clustering Logic 20 that operates to cluster event invitees (e.g. meeting invitees) into invitee clusters that are then displayed in an invitee cluster list to the Scheduling User 12 within the Graphical User Interface 14, e.g. during the process of scheduling an event. In one embodiment, the clustering of event invitees performed by the Invitee Scheduling Logic 20 is responsive to a number of invitee clustering settings that may, for example, be obtained from Scheduling User 12 through the Graphical User Interface 14, and/or received from a system administrator user or the like.

During operation of the embodiment shown in FIG. 2, a number of users (e.g. User A 50, User B 54, User C 58, etc.) enter, approve, and/or otherwise maintain respective schedule information in electronic calendars that store the corresponding user's availability to attend or otherwise participate in new calendar events, e.g. in terms of calendar times that are marked as either "BUSY" or "AVAILABLE". The calendar information for a given user is sent by the user's respective client system (e.g. Client System 52, Client System 56, Client System 60, etc.) to a server system that maintains the calendars of all participating users. For example, as shown in FIG. 2, the client systems (Client System 52, Client System 56, Client System 60, etc.) send Schedule Information 62 describing the availability of their respective users to a Calendaring System Server 44 executing on a Server System 40. The Calendaring System Server 44 retrievably stores the Schedule Information 62, e.g. into the Calendar Data Store 42. When the Scheduling User 12 indicates a number of event invitees to the Event Scheduling Client 16 through the Graphical User Interface 14, the Event Scheduling Client 16 requests the schedule information of the event invitees from the Calendaring System Server 44. In response, the Calendaring System Server 44 retrieves the electronic calendar schedule information of the event invitees for at least the target time period from the Calendar Data Store 42, and sends the retrieved schedule information as Invitee Schedules 22 to the Event Scheduling Client 16.

The Invitee Clustering Logic 20 then operates on the received availabilities of the event invitees by generating invitee clusters, and visually displays available times shared by invitees contained in the same invitee cluster to the Scheduling User 12 through an invitee cluster list provided within the Graphical User Interface 14, as further described below. The invitee cluster list thus assists the Scheduling User 12 in finding a most acceptable or best time at which to schedule an event, such as a meeting. The Client Systems 10, 52, 56 and 60 of FIG. 2 may be any specific type of a computer system or intelligent electronic device, such as desktop, laptop, or palmtop computer systems, or personal digital assistants, cell phones, or other electronic devices. The Client Systems 10, 52, 56 and 60 each include or control display devices capable of displaying a graphical user interface (e.g. including Graphical User Interface 14) to a local user (e.g. Scheduling User 12), such as a liquid crystal display (LCD), cathode ray tube (CRT), interferometric modulator display (IMOD), light emitting diode (LED), or the like.

Those skilled in the art will recognize that while the disclosed system uses a datastore of some kind that stores calendar information (e.g. Calendar Data Store 42), the data store used for this purpose need not be maintained by the disclosed system. Accordingly, the disclosed system may be embodied such that the datastore used to store calendar information is maintained externally, e.g. the datastore may be distributed to and/or among other systems. In such embodiments, the disclosed system may, for example, subscribe to an external system to obtain calendar information (e.g. from the iCal personal calendar application made by Apple Inc.). Moreover, except for purposes of improved performance, the disclosed system need not necessarily store any calendar information until the information is required to support a scheduling operation.

Those skilled in the art will further recognize that the Event Scheduling Client 16 and Calendaring System Server 44 of FIG. 2 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 10, 52, 56 and 60, and Server System 40 of FIG. 2 may each include one or more processors, and program storage, such as memory, for storing program code executable on such processors, as well as input/output devices and/or interfaces. In the example of FIG. 2, the Client Systems 10, 52, 56 and 60, and Server System 40 are interconnected through a data communication network (e.g. the Internet, a Local Area Network, etc.) using one or more of such input/output devices or interfaces, and through which may further be provided communication to a number of other client systems and/or remote server systems.

While for purposes of concise illustration only a limited number of client systems and respective users are shown in FIG. 2, the disclosed system is not limited to any specific number of users and/or client systems. Moreover, while certain functions are described as being performed in the Event Scheduling Client 16, and/or in the Calendaring System Server 44, the disclosed system is not limited to any specific configuration or implementation in that regard. Accordingly, operations described as occurring in the Event Scheduling Client 16 may alternatively be performed in the Calendaring System Server 44, and vice versa. In addition, while the illustrative embodiment of FIG. 2 is implemented in a client-server architecture, the disclosed system is not limited to such an embodiment, and may alternatively be embodied using any other specific type of system architecture that may be appropriate and or advantageous for a given implementation.

Figure 3:
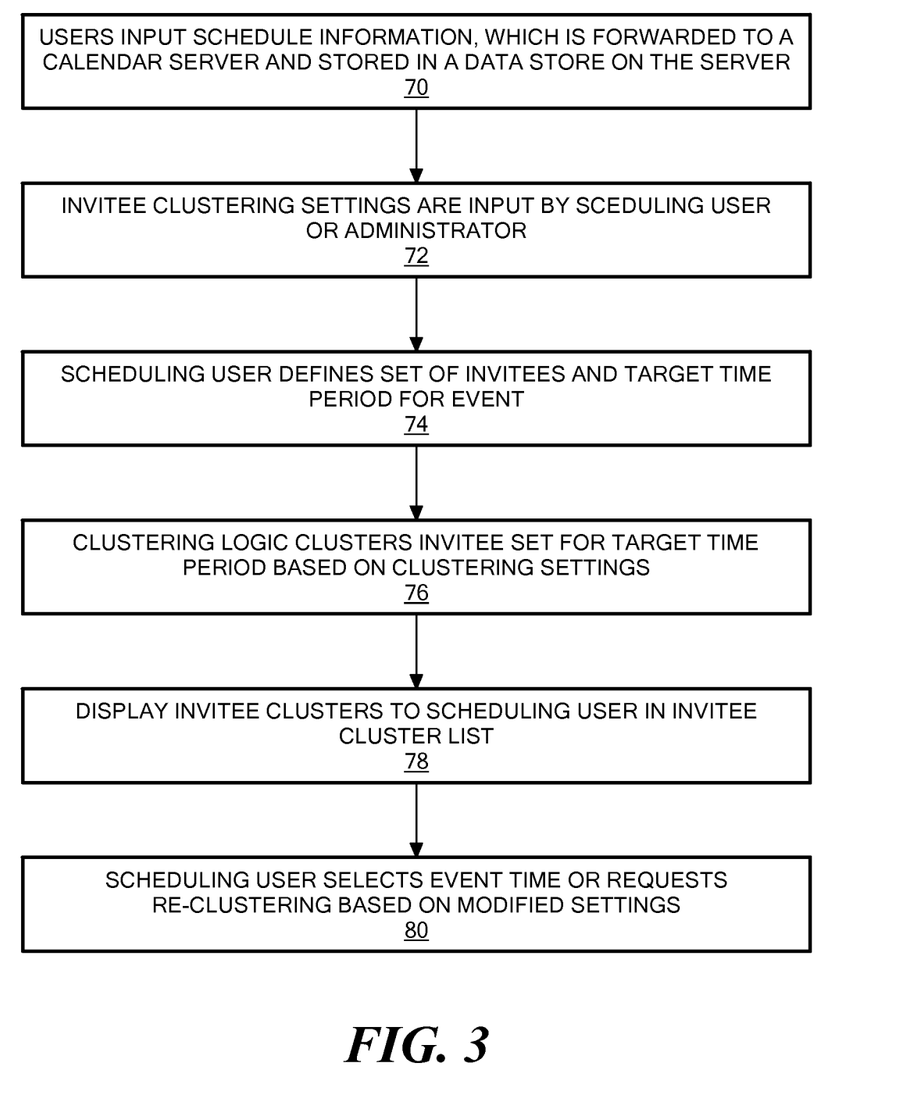
FIG. 3 is a flow chart showing steps performed during operation of an illustrative embodiment.

FIG. 3 is a flow chart showing steps performed during operation of an illustrative embodiment. As shown in FIG. 3, at step 70 the disclosed system receives schedule information input from multiple users, indicating to the disclosed system the availability of those users with regard to future calendar events. Such schedule information may, for example, be entered by individual users through graphical user interfaces on their respective client computer systems. Further at step 70, the users' schedule information is forwarded (e.g. transmitted over a communication network) to a remote server system that includes a calendaring server process that retrievably stores the schedule information within a data store on the server.

At step 72, in one embodiment, the disclosed system inputs invitee clustering settings indicating how event invitees should be clustered together, based on the similarity of their respective availabilities, as indicated by their schedule information. The settings input at step 72 may, for example, be provided to the disclosed system through a user interface generated by the disclosed system to a scheduling user during the course of selecting a time for a calendar event being defined by the scheduling user, and/or through a user interface that is generated only to administrative users, such as a system administrator user or the like. The settings input at step 72 may, for example, include an indication of how similar the availabilities of two users must be for those two users to be included in the same invitee cluster, a maximum number of invitee clusters that are to be generated, and/or any other specific settings related to generation of invitee clusters.

At step 74, the disclosed system inputs a set of invitees and a target time period for an event, for example through a graphical user interface generated to a scheduling user for the purpose of allowing the scheduling user to select an appropriate time at which to schedule a calendar event (e.g. a meeting). Any number of invitees may be indicated by the user at step 74, for example by clicking on or otherwise selecting the desired invitees from a list of users displayed in the user interface, entering in the usernames, screen names, e-mail addresses, or other identifiers of the desired invitees into a field or fields in the user interface, and/or in any other appropriate way. The target period may be any specific length of time, such as a range of hours, one or more days, one or more weeks, etc. The target period may be indicated by the scheduling user in any specific way, for example by using what is sometimes referred to as a "date picker" user interface object that allows the scheduling user to select a beginning date/time and an end date/time for the target period from a calendar display object, or by typing the beginning date/time and end date/time for the target period into a field or fields in the user interface, etc. The target period is the time period during which the scheduling user desires to schedule the meeting or other event being scheduled.

At step 76, either automatically or in response to a user action (e.g. button click, etc.), the disclosed system clusters the invitees in the invitee set input at step 74 based on the availabilities of the invitees, and, in one embodiment, on the settings input at step 72. For example, in once embodiment, a graphical button, menu option, or other selectable user interface display object is provided to a scheduling user that enables the scheduling user to cause the disclosed system to generate invitee clusters from the set of invitees input at step 74. In a first embodiment, the clustering performed at step 76 generates invitee clusters such that each invitee cluster contains invitees with identical availability during the target period. In another embodiment, the clustering performed at step 76 generates invitee clusters such that each invitee cluster contains invitees that all have availabilities during the target time period that are all sufficiently similar (e.g. have at least a threshold degree of similarity with all other invitees the cluster). Each invitee is included in at most one cluster. If an invitee cannot be included in any cluster, the embodiment of FIG. 3 treats that invitee as an "outlier" invitee, and individually represents the invitee as a corresponding "outlier" invitee in the subsequently generated invitee cluster list (see step 78 below).

At step 78, the disclosed system generates an invitee cluster list that is displayed in the user interface to the scheduling user. Each entry in the invitee cluster list represents either an invitee cluster or an outlier invitee. Each invitee cluster entry in the invitee cluster list generated at step 78 displays the number of invitees contained in the corresponding invitee cluster, and a set of available times during the target period that are shared by all invitees contained in that cluster. In an optional embodiment, the outlier invitee entries and invitee cluster entries are displayed in order from busiest (having the fewest available times during the target period) to least busy (having the most available times during the target period), further enabling the scheduling user to more easily see the best available times. In an embodiment in which invitees are clustered together based on identical availabilities, the availability displayed for an invitee cluster entry is the availability of all invitees in the corresponding cluster. In an embodiment in which invitees are clustered based on having sufficiently similar availabilities, the set of availabilities shared by all invitees contained in a cluster is displayed in the corresponding invitee cluster list entry. Outlier entries in the invitee cluster list display the name of the corresponding outlier invitee, as well as the availability of the corresponding outlier invitee during the target period.

The user interface object generated to display the invitee cluster list further enables the scheduling user to view and/or otherwise access the names and availabilities of individual invitees contained within a given cluster by clicking on or otherwise selecting the corresponding invitee cluster entry. Such names and availabilities of individual invitees in a cluster may, for example, be displayed within an invitee list having a format similar to the entries displayed in the invitee cluster list.

In another embodiment, a user interface object is also generated that enables the user to manually create invitee clusters by "dragging" invitees together (e.g. using the mouse), and/or to select multiple invitees, and then to issue a "form cluster" command or the like, in order to create an invitee cluster including those invitees. While such manually generated clusters may not be as optimal as clusters automatically generated by the disclosed system, such clusters may be useful, e.g. for clustering the members of a team together. Additionally, the disclosed system may be embodied to allow the user to enter user-defined clustering rules that cause the disclosed system to automatically create user-defined invitee clusters that meet the user's specific needs. For example, such an embodiment would enable a user to define a rule causing all invitees within a specified facility to be clustered together (e.g. "people in building 5"), all invitees with a particular job title to be clustered together (e.g. "people with job title developer"), etc.

At step 80, the disclosed system detects user selection of a time at which the event is to be scheduled, or user indication that invitees should be re-clustered based on new and/or modified invitee clustering settings. For example, the disclosed system may be embodied to display a graphical button, menu item, or other type of user interface object, that, when selected (e.g. clicked on) by the scheduling user, enables the scheduling user to re-enter the invitee clustering settings described above in connection with step 72, and/or re-enter or modify the set of invitees and/or target time period entered at step 74. After such new or modified clustering settings, invitees, and/or target period are input, the disclosed system operates to re-cluster the invitees (step 76) and display the new invitee cluster list (step 78). Thus the disclosed system enables the scheduling user to cause the invitee set to be re-clustered using new parameters as many times as are needed to find an acceptable time at which a meeting or other calendar event can be scheduled. Re-clustering may also be automatically performed at step 80 in the event that the disclosed system detects that the total number of invitee clusters exceeds a user defined maximum number of clusters, and/or in response to a user indication that the determined invitee clusters are undesirable. To automatically limit/reduce the number of invitee clusters to a user-specified maximum, the disclosed system may use various specific approaches. For example, invitees may first be clustered based on similarity without limitation as to total number of clusters, and the resulting number of invitee clusters counted. In the event that the total number of invitee clusters exceeds the maximum, the number of invitee clusters is reduced. In one approach, the disclosed system reduces the number of invitee clusters by iteratively combining the two clusters that are most similar in terms of availability. Accordingly, after each such reduction, the resulting number of clusters is compared to the allowed maximum. If the total number of clusters still exceeds the maximum, the two most similar clusters are again combined, until the total number of invitee clusters is reduced to be no greater than the maximum. In an alternative approach, the disclosed system iteratively reduces the degree of similarity required for invitees to be clustered together, re-clustering the invitees after each such reduction until the total number of invitee clusters is no greater than the maximum. Other ways may alternatively be used to reduce the number of invitee clusters so that the maximum number is not exceeded.

While for purposes of illustration the steps FIG. 3 are shown and described in a specific order, the disclosed system is not limited in this regard. Accordingly, the steps shown in FIG. 3 could be performed in orders different from that shown, as may be appropriate for a given embodiment. In particular, the retrieval of schedule information in step 70 could alternatively be performed after the invitees are established (step 74).

Figure 4:
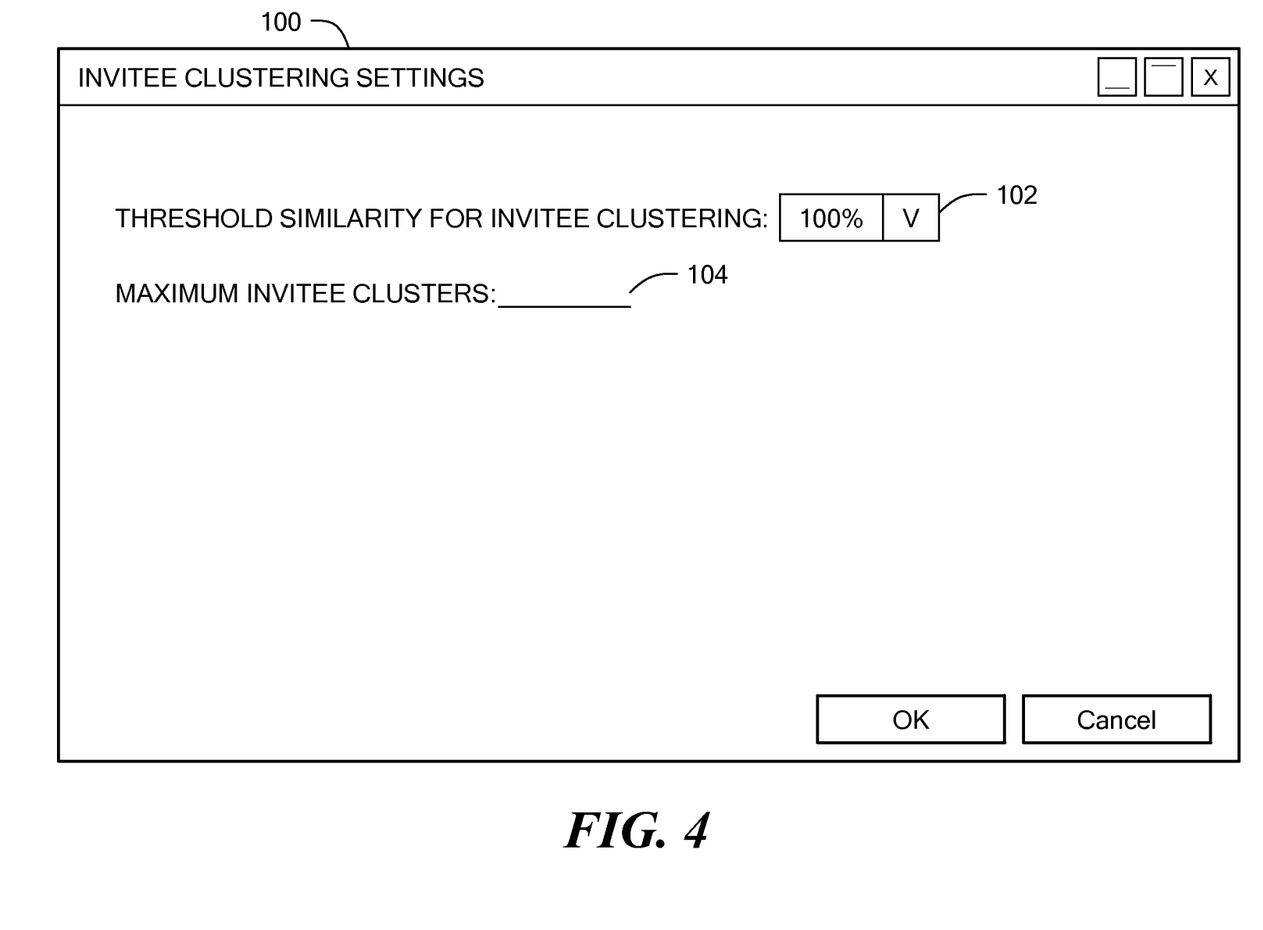
FIG. 4 is a simplified screen shot showing an example of a user interface display object for configuring invitee clustering operations.

FIG. 4 is a simplified screen shot showing an example of a user interface display object 100 for configuring invitee clustering operations. The user interface display object 100 may, for example, be displayed in the Graphical User Interface 14 of FIG. 1 to the Scheduling User 12. The user interface display object 100 includes a selectable clustering threshold 102 (e.g. pull down list of percentages) that allows a scheduling user (or alternatively an administrative user) to indicate the minimum similarity of availabilities that is required for two invitees to be included in the same invitee cluster. A user-fillable field 104 is also provided in the user interface display object 100 to allow the scheduling user to indicate a maximum number of clusters into which the invitees in the invitee set are to be clustered. The user interface object 100 and/or another user interface display object may further include fields that allow a user to define, enter and/or select rules to be used by the disclosed system to automatically generate user-defined clusters. Such rules may, for example, include rules such as "cluster by location", "cluster by team", "cluster by job title", etc.

The specific user interface mechanisms of FIG. 4 are given only for purposes of illustration, and any other specific user interface object or objects may be used alternatively to allow for a user to input invitee clustering settings, as may be appropriate for a given embodiment or implementation.

Figure 5:
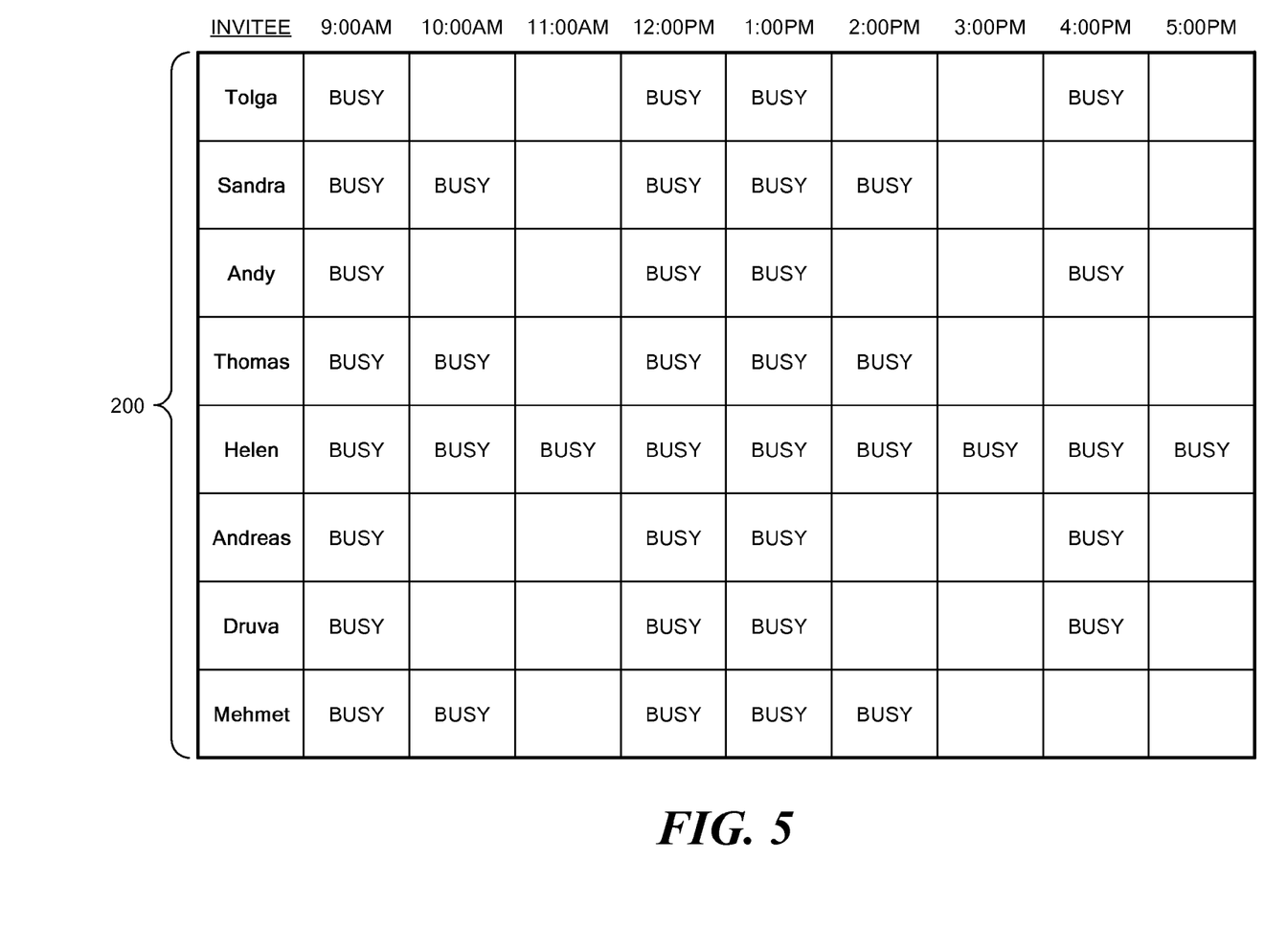
FIG. 5 is a simplified screen shot showing a portion of a user interface display object including an invitee list.

FIG. 5 is a simplified screen shot showing a portion of a user interface display object including an invitee list 200. The invitee list 200 may, for example, be generated as part of the Graphical User Interface 14. The invitee list 200 includes entries for all users that the scheduling user desires to invite to the calendar event being scheduled.

Each entry in the invitee list 200 represents an invitee selected by a scheduling user during the process of determining an acceptable time to schedule a calendar event, such as a meeting. Each entry in the invitee list 200 displays a corresponding user's name and the times during the target period that the corresponding user is available (for example, those times not marked "BUSY" are available). For purposes of illustration, the target time period of the invitee list 200 covers the times beginning from 9:00 AM to 5:00 PM during a single day.

Figure 6:
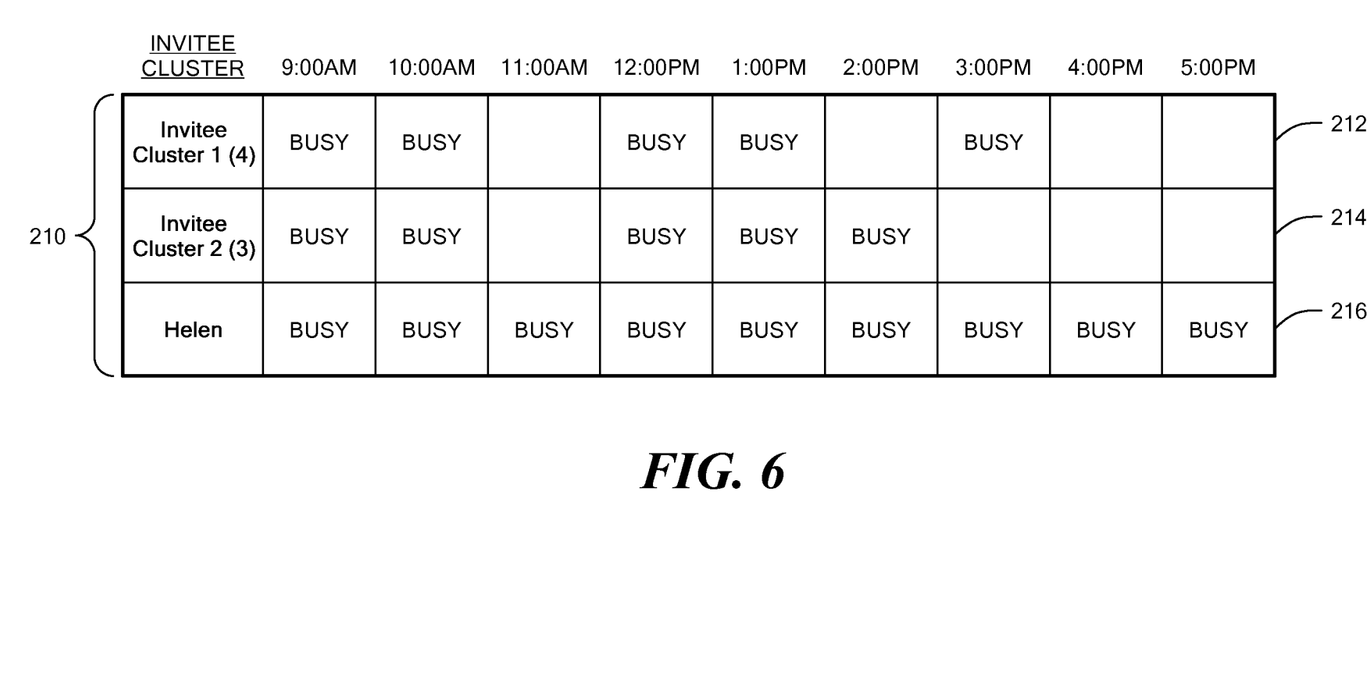
FIG. 6 is a simplified screen shot showing a portion of a user interface display object including a invitee cluster list generated based on the invitee list of FIG. 4.

FIG. 6 is a simplified screen shot showing a portion of a user interface display object including an invitee cluster list 210 generated by an embodiment of the disclosed system based on the invitee list 200 of FIG. 5. The invitee cluster list 210 is generated by an embodiment of the disclosed system that operates to cluster invitees together that have identical availabilities. Accordingly, the invitee cluster list 210 includes a first invitee cluster list entry 212 representing an Invitee Cluster 1 that includes four (4) invitees having identical availabilities: Tolga, Andy, Andreas, and Druva. Invitee cluster list entry 212 displays the number of invitees Invitee Cluster 1 contains (i.e. 4), as well as indications of the available times for all the invitees contained in Invitee Cluster 1 (i.e. 10:00 AM, 11:00 AM, 2:00 PM, 3:00 PM and 5:00 PM—those times not marked "BUSY"). Invitee cluster list entry 214 represents Invitee Cluster 2, which includes three (3) invitees having identical availabilities: Sandra, Thomas and Mehmet. Invitee cluster list entry 214 displays the number of invitees Invitee Cluster 2 contains (i.e. 3), as well as indications of the available times for all the invitees contained in Invitee Cluster 2 (i.e. 11:00 AM, 3:00 PM, 4:00 PM and 5:00 PM—those times not marked "BUSY"). The invitee cluster list 210 further includes an outlier entry 216 for invitee Helen, since Helen's availability does not match any other invitee's availability. The outlier entry 216 displays the name of the corresponding outlier user (i.e. Helen), and the availability of the outlier user (e.g. no times during the target period). The scheduling user can obtain an invitee list showing the names and individual availabilities for a given invitee cluster by clicking on or otherwise selecting the name of the invitee cluster in the corresponding invitee cluster list entry. For example, clicking on the text "Invitee Cluster 1 (4)" causes a list of the users in Invitee Cluster 1 to be displayed, i.e. Tolga, Andy, Andreas, and Druva.

Figure 7:
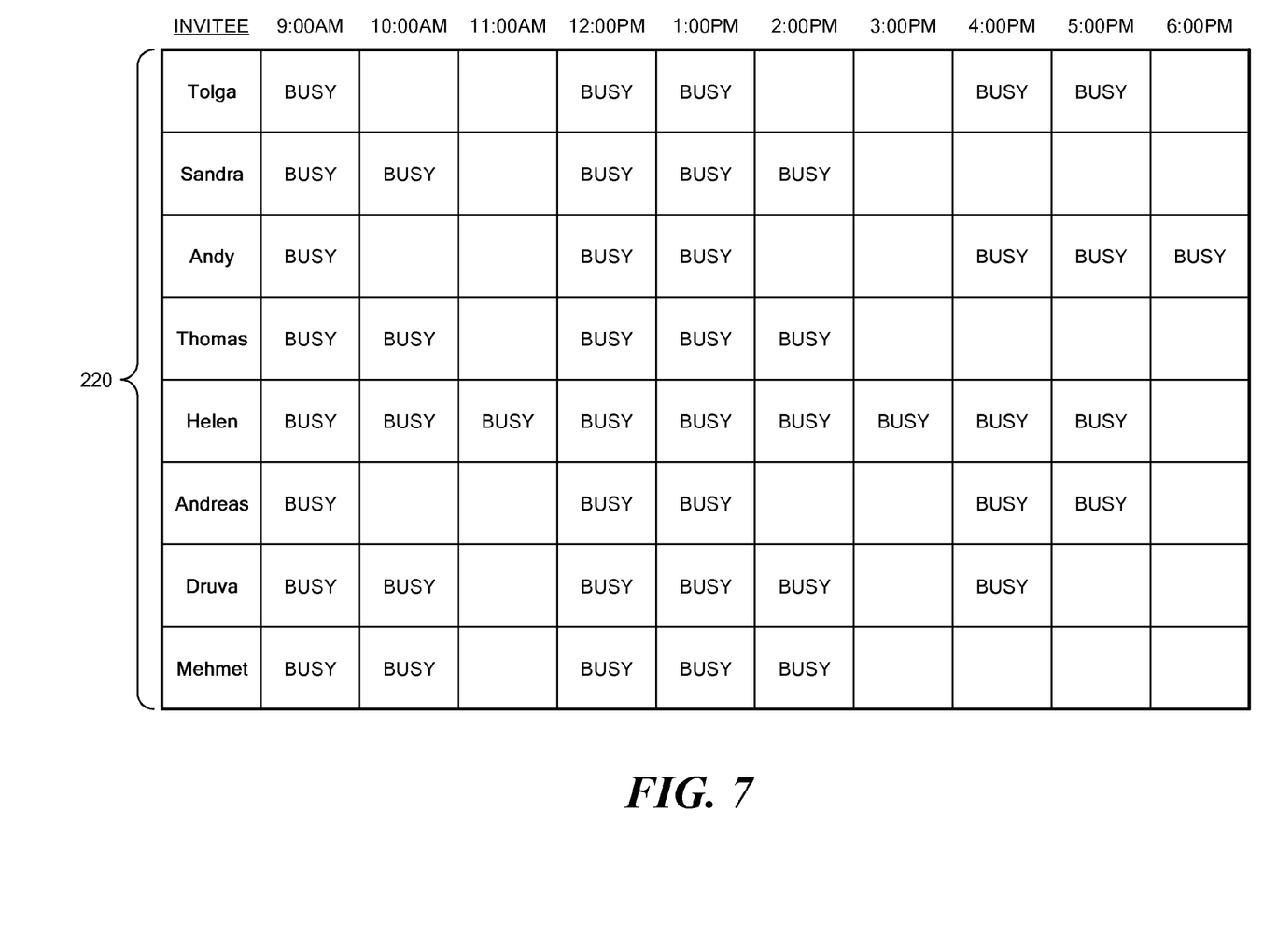
FIG. 7 is a simplified screen shot showing a portion of a user interface display object including an invitee list.

FIG. 7 is a simplified screen shot showing a portion of a user interface display object including an invitee list 220. The invitee list 220 may, for example, be generated as part of the Graphical User Interface 14. The invitee list 220 includes an entry for each user that the scheduling user desires to invite to the calendar event being scheduled.

Each entry in the invitee list 220 represents an invitee selected by a scheduling user during the process of determining an acceptable time to schedule a calendar event, such as a meeting. Each entry in the invitee list 220 displays a corresponding user's name and the times during the target period that the corresponding user is available (those times not marked "BUSY" are available). For purposes of illustration, the target time period of the invitee list 220 covers the times starting from 9:00 AM to 6:00 PM during a single day.

Figure 8:
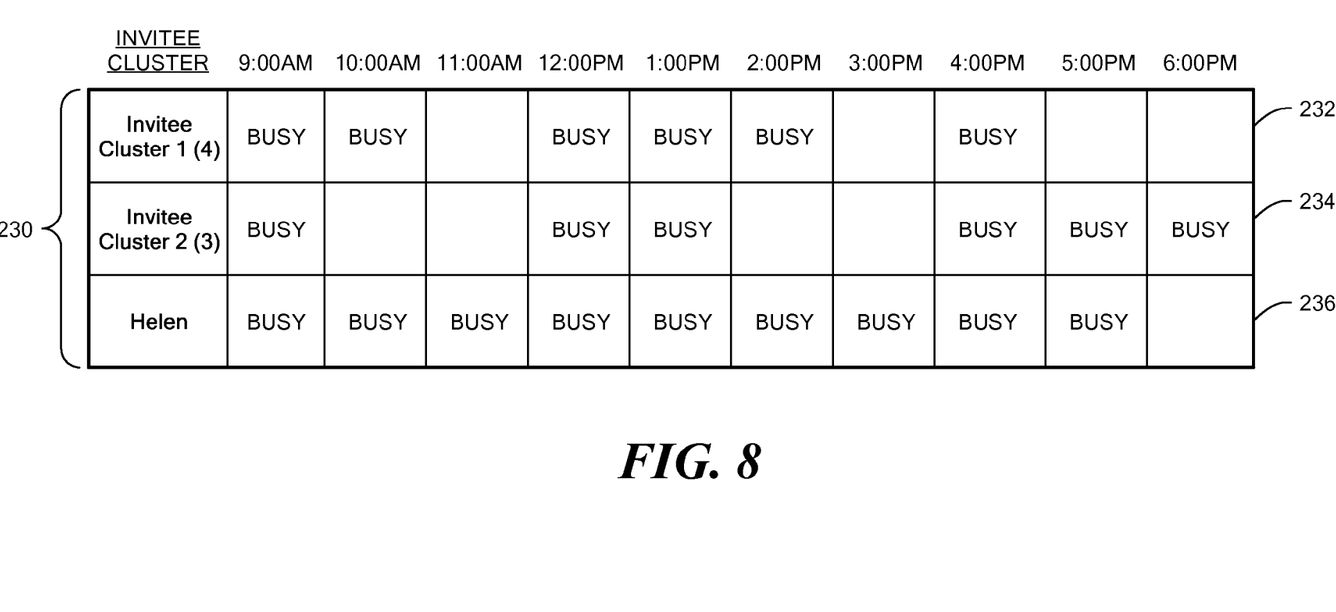
FIG. 8 is a simplified screen shot showing a portion of a user interface display object including a invitee cluster list generated based on the invitee list of FIG. 4.

FIG. 8 is a simplified screen shot showing a portion of a user interface display object including a invitee cluster list 230 generated by an embodiment of the disclosed system based on the invitee list 220 of FIG. 7. The invitee cluster list 230 is generated by an embodiment of the disclosed system that operates to cluster invitees together that have sufficiently similar availabilities. For example, the invitee cluster list 230 is generated based on the invitee list 220, and also based on the scheduling user having previously entered (e.g. through the user interface display object 100 of FIG. 4) an invitee clustering setting indicating that invitees are to be clustered together only if they have availabilities that are at least seventy-five percent (75%) the same. Accordingly, the invitee cluster list 210 includes a first invitee cluster list entry 232 representing an Invitee Cluster 1 that includes four (4) invitees having availabilities that are all at least 75% the same: Sandra, Thomas, Druva and Mehmet. Invitee cluster list entry 232 displays the number of invitees Invitee Cluster 1 contains (i.e. 4), as well as indications of the times that are available for all the invitees contained in Invitee Cluster 1 (i.e. 11:00 AM, 3:00 PM, 5:00 PM and 6:00 PM—times not marked "BUSY" in any of Sandra, Thomas, Druva or Mehmet's schedules). Invitee cluster list entry 234 represents Invitee Cluster 2, which includes three (3) invitees having availabilities that are at least 75% the same: Tolga, Andy and Andreas. Invitee cluster list entry 234 displays the number of invitees Invitee Cluster 2 contains (i.e. 3), as well as indications of the times that are available for all the invitees contained in Invitee Cluster 2 (i.e. 10:00 AM, 11:00 AM, 2:00 PM and 3:00 PM—those times not marked "BUSY" in any of Tolga, Andy or Andreas' schedules). The invitee cluster list 230 further includes an outlier entry 236 for invitee Helen, since Helen's availability does is not at least 75% the same as any other invitee's availability. The outlier entry 236 displays the name of the corresponding outlier user (i.e. Helen), and the availability of the outlier user (i.e. only available at 6:00 PM during the target period).

The scheduling user can obtain an invitee list showing the names and individual availabilities for a given invitee cluster by clicking on or otherwise selecting the name of the invitee cluster in the corresponding invitee cluster list entry. For example, clicking on the text "Invitee Cluster 1 (4)" would cause a list of the users in Invitee Cluster 1, i.e. Sandra, Thomas, Druva or Mehmet and their respective availabilities during the target period.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for generating an event scheduling user interface, comprising:
   inputting a plurality of event invitees and corresponding availabilities over a target time period, wherein said target time period includes multiple times;
   inputting a user-specified maximum number of invitee clusters from an event scheduling user through said event scheduling user interface;
   generating a plurality of invitee clusters, wherein each of said invitee clusters includes a plurality of said event invitees that each has at least a threshold percentage of available times in common during said target time period, wherein each of said event invitees is included in only one of said invitee clusters;
   automatically comparing a total number of invitee clusters in said plurality of invitee clusters to said user-specified maximum number of invitee clusters;
   in response to said total number of invitee clusters in said plurality of invitee clusters exceeding said user-specified maximum number of invitee clusters, reducing said total number of invitee clusters in said plurality of invitee clusters to match said user-specified maximum number of invitee clusters by automatically and iteratively combining two of said invitee clusters that are the most similar in the availabilities in said plurality of invitee clusters into a single invitee cluster;

in response to said total number of invitee clusters in said plurality of invitee clusters exceeding said user-specified maximum number of invitee clusters, automatically and iteratively and without input from said event scheduling user reducing said threshold percentage and re-generating said plurality of invitee clusters until said total number of invitee clusters in said plurality of invitee clusters is less than or equal to said user-specified maximum number of invitee clusters; and displaying an invitee cluster list, wherein said invitee cluster list includes a plurality of entries, each one of said invitee cluster list entries representing a corresponding one of said plurality of invitee clusters, wherein each said invitee cluster list entry displays a list of times during which all event invitees in said corresponding one of said plurality of invitee clusters are available during said target time period.

2. The method of claim 1, further comprising:
wherein each said invitee cluster list entry further displays a number of said event invitees included in said corresponding one of said plurality of invitee clusters.

3. The method of claim 2, wherein said displaying said invitee cluster list further comprises:
displaying at least one outlier entry, wherein said outlier entry represents one of said event invitees not included in any of said invitee clusters; and
wherein said outlier entry displays a name of said one of said event invitees not included in any of said invitee clusters and a list of times during which said one of said event invitees not included in any of said invitee clusters is available during said target time period.

4. The method of claim 3, further comprising:
detecting user selection of one of said invitee cluster list entries;
responsive to said detecting said user selection of said one of said invitee cluster list entries, displaying an invitee list, said invitee list including a plurality of invitee list entries, each of said invitee list entries representing a corresponding one of said plurality of event invitees included in said invitee cluster corresponding to said selected one of said invitee cluster list entries, and wherein each of said invitee list entries displays a name of said corresponding event invitee and a list of times during which said corresponding event invitee is available during said target time period.

5. The method of claim 4, further comprising inputting said threshold percentage from an event scheduling user.

6. The method of claim 1, wherein two given event invitees have said threshold percentage of available times in common during said target time period only if said two given event invitees have identical available times during said target time period.

7. The method of claim 1, wherein said generating said plurality of invitee clusters further comprises generating at least one user defined invitee cluster.

8. The method of claim 7, wherein said generating said at least one user defined invitee cluster is responsive to manual user selection of a plurality of invitees to be included in said user defined invitee cluster through a user interface display object.

9. The method of claim 7, wherein said generating said at least one user defined invitee cluster is responsive to at least one user defined rule indicating which invitees are to be included in said user defined invitee cluster.

10. A system including a non-signal computer readable medium, said computer readable medium having program code stored thereon operable, when executed, to cause a computer system to generate an event scheduling user interface by:
inputting a plurality of event invitees and corresponding availabilities over a target time period, wherein said target time period includes multiple times;
inputting a user-specified maximum number of invitee clusters from an event scheduling user through said event scheduling user interface;
generating a plurality of invitee clusters, wherein each of said invitee clusters includes a plurality of said event invitees that each has at least a threshold percentage of available times in common during said target time period, wherein each of said event invitees is included in only one of said invitee clusters;
automatically comparing a total number of invitee clusters in said plurality of invitee clusters to said user-specified maximum number of invitee clusters;
in response to said total number of invitee clusters in said plurality of invitee clusters exceeding said user-specified maximum number of invitee clusters, reducing said total number of invitee clusters in said plurality of invitee clusters to match said user-specified maximum number of invitee clusters by automatically and iteratively combining two of said invitee clusters that are the most similar in the availabilities in said plurality of invitee clusters into a single invitee cluster;
in response to said total number of invitee clusters in said plurality of invitee clusters exceeding said user-specified maximum number of invitee clusters, automatically and iteratively and without input from said event scheduling user reducing said threshold percentage and re-generating said plurality of invitee clusters until said total number of invitee clusters in said plurality of invitee clusters is less than or equal to said user-specified maximum number of invitee clusters; and
displaying an invitee cluster list, wherein said invitee cluster list includes a plurality of entries, each one of said invitee cluster list entries representing a corresponding one of said plurality of invitee clusters, wherein each said invitee cluster list entry displays a list of times during which all event invitees in said corresponding one of said plurality of invitee clusters are available during said target time period.

11. The system of claim 10, further comprising:
wherein each said invitee cluster list entry further displays a number of said event invitees included in said corresponding one of said plurality of invitee clusters.

12. The system of claim 11, further comprising:
wherein said displaying said invitee cluster list includes displaying at least one outlier entry, wherein said outlier entry represents one of said event invitees not included in any of said invitee clusters; and
wherein said outlier entry displays a name of said one of said event invitees not included in any of said invitee clusters and a list of times during which said one of said event invitees not included in any of said invitee clusters is available during said target time period.

13. The system of claim 11, wherein said program code is further operable, when executed, to cause said computer system to generate said event scheduling user interface by further:

detecting user selection of one of said invitee cluster list entries;

responsive to said detecting said user selection of said one of said invitee cluster list entries, displaying an invitee list, said invitee list including a plurality of invitee list entries, each of said invitee list entries representing a corresponding one of said plurality of event invitees included in said invitee cluster corresponding to said selected one of said invitee cluster list entries, and wherein each of said invitee list entries displays a name of said corresponding event invitee and a list of times during which said corresponding event invitee is available during said target time period.

14. The system of claim 13, said program code further operable, when executed, to cause said computer system to generate said event scheduling user interface by inputting said threshold percentage from an event scheduling user.

15. The system of claim 10, wherein two given event invitees have said threshold percentage of available times in common during said target time period only if said two given event invitees have identical available times during said target time period.

16. The system of claim 10, wherein said generating said plurality of invitee clusters further comprises generating at least one user defined invitee cluster.

17. The system of claim 16, wherein said generating said at least one user defined invitee cluster is responsive to manual user selection of a plurality of invitees to be included in said user defined invitee cluster through a user interface display object.

18. The system of claim 16, wherein said generating said at least one user defined invitee cluster is responsive to at least one user defined rule indicating which invitees are to be included in said user defined invitee cluster.

19. A computer program product including a non-signal computer readable medium, said computer readable medium having program code stored thereon for generating an event scheduling user interface, said program code comprising:

program code for inputting a plurality of event invitees and corresponding availabilities over a target time period, wherein said target time period includes multiple times;

program code for generating a plurality of invitee clusters, wherein each of said invitee clusters includes a plurality of said event invitees that each has at least a threshold percentage of available times in common during said target time period, wherein each of said event invitees is included in only one of said invitee clusters;

program code for automatically comparing a total number of invitee clusters in said plurality of invitee clusters to said user-specified maximum number of invitee clusters;

program code for, in response to said total number of invitee clusters in said plurality of invitee clusters exceeding said user-specified maximum number of invitee clusters, reducing said total number of invitee clusters in said plurality of invitee clusters to match said user-specified maximum number of invitee clusters by automatically and iteratively combining two of said invitee clusters that are the most similar in the availabilities in said plurality of invitee clusters into a single invitee cluster;

program code for, in response to said total number of invitee clusters in said plurality of invitee clusters exceeding said user-specified maximum number of invitee clusters, automatically and iteratively and without input from said event scheduling user reducing said threshold percentage and re-generating said plurality of invitee clusters until said total number of invitee clusters in said plurality of invitee clusters is less than or equal to said user-specified maximum number of invitee clusters; and program code for displaying an invitee cluster list, wherein said invitee cluster list includes a plurality of entries, each one of said invitee cluster list entries representing a corresponding one of said plurality of invitee clusters, wherein each said invitee cluster list entry displays a list of times during which all event invitees in said corresponding one of said plurality of invitee clusters are available during said target time period.

* * * * *